April 21, 1959   F. P. BIONDO   2,883,234
VEHICLE DASH COMPARTMENT
Filed Sept. 13, 1957   3 Sheets-Sheet 1

INVENTOR.
Frank P. Biondo
BY
L.D. Burch
ATTORNEY

April 21, 1959 F. P. BIONDO 2,883,234
VEHICLE DASH COMPARTMENT
Filed Sept. 13, 1957 3 Sheets-Sheet 2

INVENTOR.
Frank P. Biondo
BY
L. D. Burch
ATTORNEY

April 21, 1959 F. P. BIONDO 2,883,234
VEHICLE DASH COMPARTMENT
Filed Sept. 13, 1957 3 Sheets-Sheet 3

INVENTOR.
Frank P. Biondo
BY
ATTORNEY

United States Patent Office 2,883,234
Patented Apr. 21, 1959

2,883,234

VEHICLE DASH COMPARTMENT

Frank P. Biondo, Detroit, Mich., assignor to General Motors Corporation, Detroit, Mich., a corporation of Delaware Application September 13, 1957, Serial No. 683,859

5 Claims. (Cl. 296—37)

The invention relates to automotive vehicle dash compartments and more particularly to the mounting of compartments such as glove boxes which are recessed within the dash and moved rearwardly for easy access.

Many glove boxes have been provided with swinging hinged access doors while the glove boxes themselves are integrally formed as a part of the dash compartments. It is also common practice to provide vehicle dashes with a downwardly and forwardly slanting cover panel. The contour of the glove compartment door usually follows the contour of this panel. As a result, much of the space in the glove box is not usable since it is directly over a portion of the lid. Drawer-type glove boxes have also been proposed. However, these boxes must be moved rearwardly of the vehicle a considerable distance to provide adequate access. The glove box and mount now proposed retains the advantages of the drawer-type box in that the space is fully available for storage. The glove box mounting permits adequate access to the box without requiring it to be rearwardly extended an inordinate distance. Furthermore, the particular mounting permits such accessories as ash trays to be mounted within the glove box drawer and allows them to be used by vehicle occupants when the glove box is either opened or closed. The mount also provides a sturdy positive stop arrangement which firmly supports the box in the open position even when the box contains items having considerable weight.

These advantages are obtained by using a parallelogram linkage with interlocking features for holding the glove box in the open position. The box is counterbalanced for easy opening and closing and is always held in the horizontal position so that items stored therein are not disturbed when the box is opened or closed.

Figure 1:
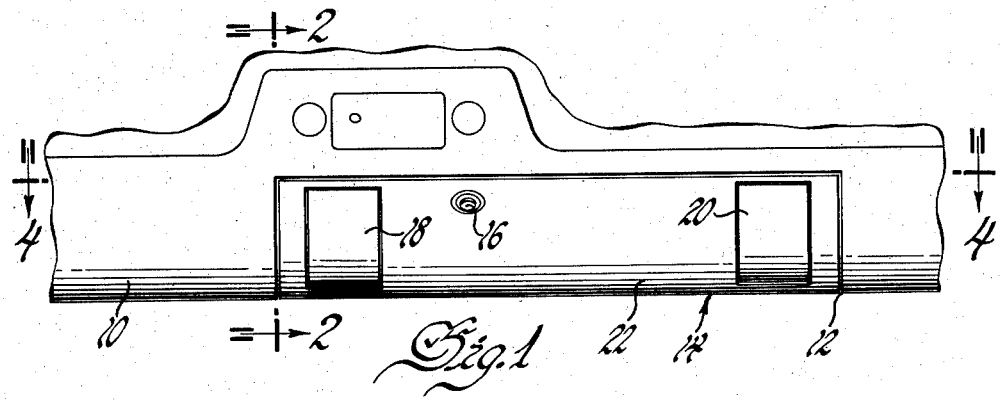
Figure 1 is a view of an automotive vehicle dash having a glove box embodying the invention.
Figure 2:
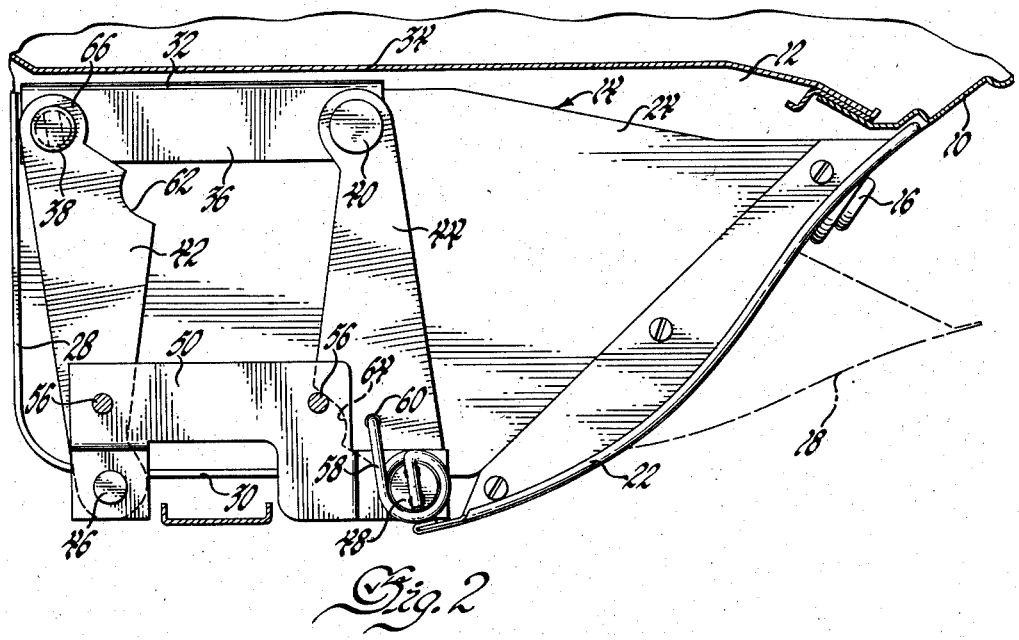
Figure 2 is a view of the glove box of Figure 1 taken in the direction of arrows 2—2 of that figure and having parts broken away and in section.

As shown in Figure 1, the vehicle dash 10 is provided with a recessed space 12 in which glove box 14 is mounted. The glove box is provided with a lock and access button 16 by which the box may be locked and unlatched when in the closed position. The glove box 14 may be provided with rearwardly pivotable ash trays 18 and 20 which are mounted when closed in a position flush with the glove box rear panel 22, front and rear relations being considered relative to the vehicle in which the glove box is mounted. The glove box is also provided with side panels 24 and 26, front panel 28 and bottom panel 30. A front cover panel 32 may also be provided if desired. This panel will aid in preventing items stored within the box from becoming stuck between the glove box and the vehicle dash panel 34.

The glove box 14 is mounted on parallel link mount which includes upper links 36. These links are attached to glove box side panels 24 and 26 respectively. Each of the links 36 is provided with an upper front pivot 38 and an upper rear pivot 40 to which are respectively attached front pivot link 42 and rear pivot link 44. These links in turn are pivotally attached by lower front pivot 46 and lower rear pivot 48 to lower link 50. Lower links 50 are secured to the dash frame 52 by mounting brackets 54 through bolts or screws 56. Counterbalance springs 58 have one end extending in a slot provided in the ends of pivots 48 and the other end extending through apertures 60 formed in rear pivot links 44. These springs are biased to aid in holding the glove box in the closed position and to aid in the lifting of the box from the opened position to the closed position.

Figure 3:
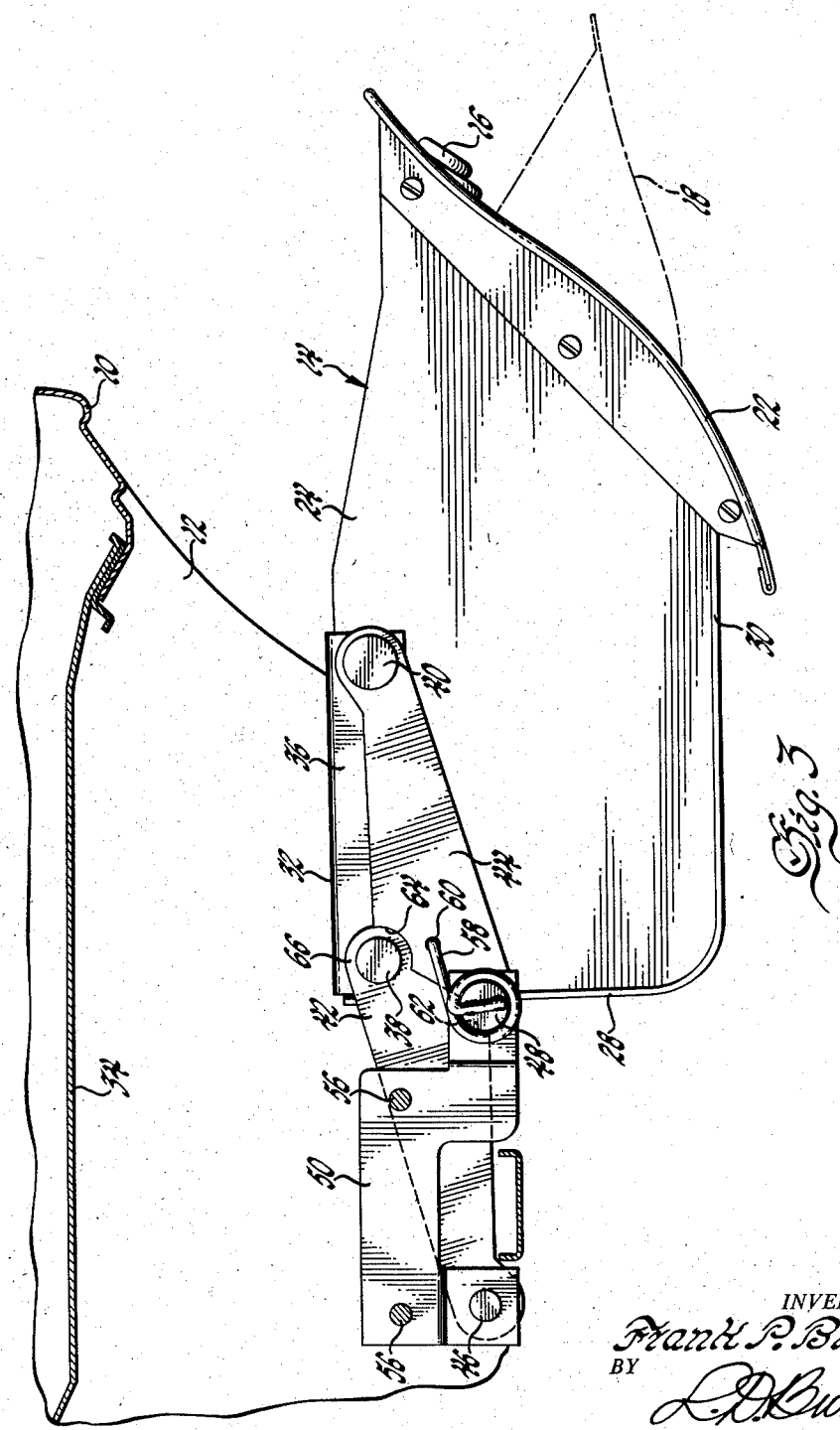
Figure 3 is a view similar to Figure 2 but with the glove box in the open position.
Figure 4:
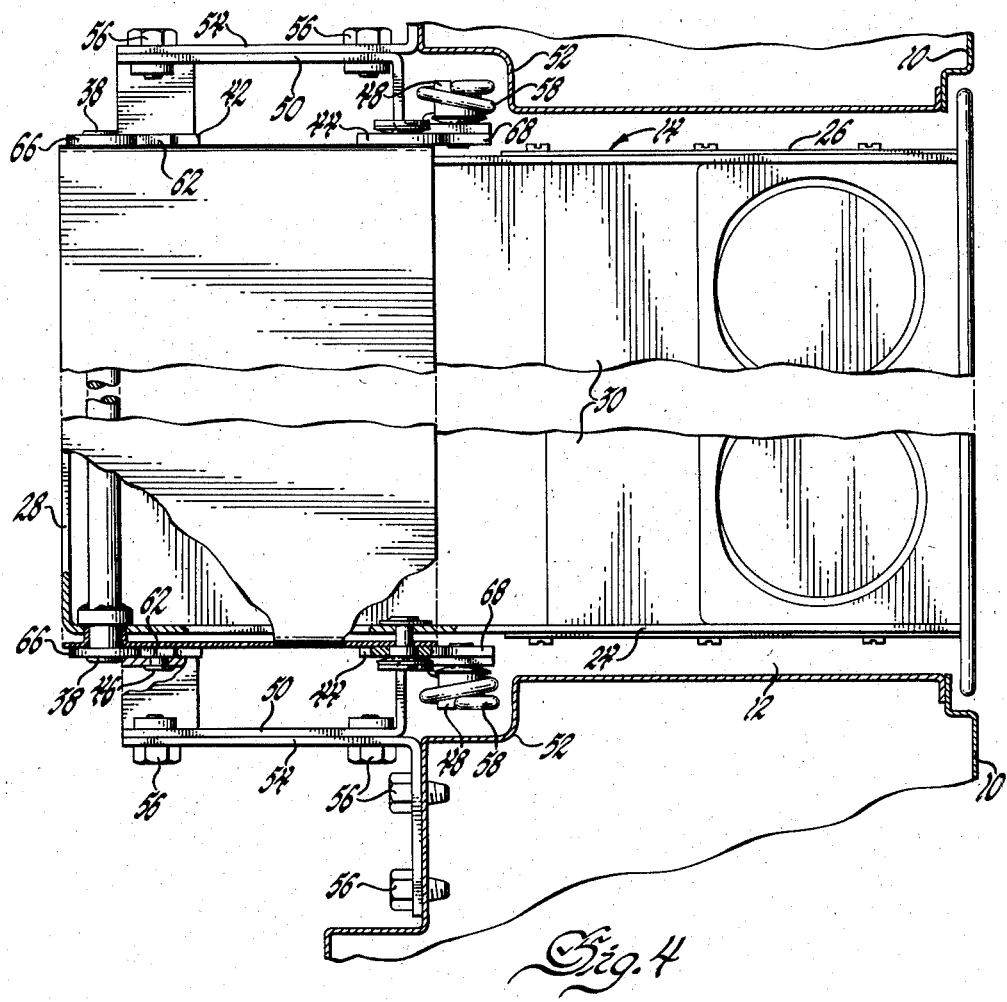
Figure 4 is a plan view of the glove box in a closed position with parts broken away and in section.

Pivot links 42 and 44 are provided with notches 62 and 64 and rounded ends 66 and 68 respectively. These notches are so positioned that when the glove box is in the open position, notch 62 receives and engages rounded end 68 of link 44 and notch 64 receives and engages rounded end 66 of link 42 to provide a positive locking stop arrangement. The mount is shown in this position in Figure 3.

Glove box 14 is held in a horizontal position by the mounting system at all times. The ash trays 18 and 20 may be used by the vehicle occupants when the glove box is either in the opened or closed position. The box is locked firmly in the open position to prevent warping of the links and is easily moved between the open and closed positions since it is spring counterbalanced. A glove box has thus been provided which conforms to the contour of a forwardly slanting dash panel while providing greater storage capacity than that obtainable in hinged door type glove boxes.

What is claimed is:

1. In an automotive vehicle having a dash, a glove box received within a recessed space in said dash, pivotable mounting means for said glove box including spaced parallel mounting links, each of said links having a first pivot operatively connecting one end of said link to said glove box and a second pivot operatively connecting the other end of said link to said dash, at least one of said links having a notch formed therein and receiving and engaging an end of one of said other links when said glove box is in the open position.

2. Pivotable mounting means for a storage compartment received within a vehicle dash and movable on said means to an open position and a closed position within said dash, said pivotable mounting means including an upper link secured to said storage compartment and a lower link secured to said dash, a pair of spaced parallel links pivotally connected to said upper link and said lower link, and spring counterbalancing means engaging one of said parallel links and urging said storage compartment toward the closed position.

3. The combination of a glove box mounted for pivotal movement in a vehicle dash, mounting means for said glove box including pivotal parallel mounting linkage whereby said glove box is retained in a horizontal position at all times, and an ash tray received within an outer panel of said glove box and outwardly pivotable therefrom, said ash tray being accessible in all positions of said glove box.

4. Pivotable parallelogram mounting mechanism for a storage compartment in an automobile vehicle dash, said mounting mechanism including a pair of oppositely disposed linkages, each of said linkages including an upper link secured to said storage compartment, a lower link secured to said dash, spaced parallel pivot links, pivot means securing one end of each of said pivot links to said upper link and the other end of said pivot links to said lower link, contoured notches being formed in each of said pivot links, each of said notches receiving a complementary contoured end of the other of said links when said storage compartment is in the open position, said notches and said link ends thereby comprising a positive stop mechanism.

5. The mounting mechanism of claim 4, one of said pivot means having a counterbalancing spring attached thereto, said spring operatively connecting and reacting against one of said pivot links and one of said other links to urge said mounting mechanism toward the closed position.

References Cited in the file of this patent

UNITED STATES PATENTS

| | | |
|---|---|---|
| 1,893,624 | Jay | Jan. 10, 1933 |
| 1,951,594 | Carroll | Mar. 20, 1934 |
| 2,557,735 | Fox | June 19, 1951 |